United States Patent [19]

Huff et al.

[11] Patent Number: 4,677,088
[45] Date of Patent: Jun. 30, 1987

[54] HIGH EFFICIENCY POLYMERIZATION CATALYST COMPONENT FOR USE IN THE POLYMERIZATION OF PROPYLENE AND HIGHER ALPHA-OLEFINS

[75] Inventors: Terrence Huff, Baytown, Tex.; Arthur W. Langer, Jr., Watchung, N.J.

[73] Assignee: Exxon Chemical Patents Inc., Linden, N.J.

[21] Appl. No.: 868,504

[22] Filed: May 30, 1986

[51] Int. Cl.$^4$ .............................................. C08F 4/64
[52] U.S. Cl. ............................ 502/121; 502/108; 502/117; 502/124; 502/125; 502/127; 526/139; 526/141; 526/142
[58] Field of Search ............... 502/117, 121, 124, 125, 502/127, 108

[56] References Cited

U.S. PATENT DOCUMENTS 4,525,467 6/1985 Huff et al. ............................ 502/121

Primary Examiner—Patrick P. Garvin
Attorney, Agent, or Firm—M. B. Kurtzman

[57] ABSTRACT

An aromatic hydrocarbon modified soluble mixed aluminum hydrocarbyl-Lewis base co-catalyst composition comprising (i) at least two different classes of aluminum hydrocarbyls the first being an aluminum hydrocarbyl halide, the second being an aluminum hydrocarbyl hydride and/or aluminum trialkyl and (ii) at least one Lewis base represented by the formula:

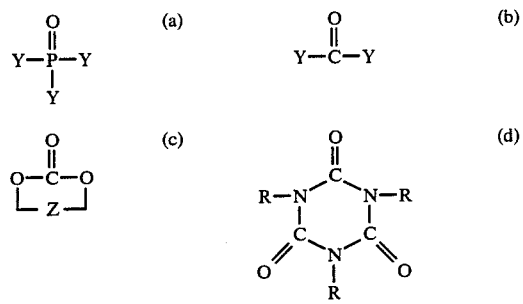

wherein each Y can be —OR', —NR$_2$ and R' with the proviso that at least two be —OR' or —NR$_2$, Z is an alkylene radical forming a 5 or 6 membered ring with the carbonyldioxy group or Z is alkyl substituted alkylene group wherein the alkyl radical can have from 1 to 8 carbon atoms, R is an aryl, allyl or alkyl group having from 1 to 20 carbon atoms and R' is an alkyl, cycloalkyl, aryl or aralkyl radical having from 1 to 20 carbon atoms.

The co-catalyst is employed with a titanium halide catalyst for the polymerization of olefins to obtain a advantageous balance of catalytic activity and polymer product stereoregularity.

19 Claims, No Drawings

HIGH EFFICIENCY POLYMERIZATION CATALYST COMPONENT FOR USE IN THE POLYMERIZATION OF PROPYLENE AND HIGHER ALPHA-OLEFINS

BACKGROUND OF THE INVENTION

This invention relates to a new co-catalyst composition which comprises mixed organoaluminum compounds and certain Lewis bases dissolved in at least one aromatic solvent. The co-catalyst system in combination with a transition metal catalyst is useful for the production of polyolefins in accordance with a high efficiency process for producing polyolefins. The invention, therefore, further relates to a catalyst system comprising the co-catalyst composition and to the process of polymerizing one or more olefins in the presence of the catalyst system.

DISCUSSION OF THE PRIOR ART

In accordance with the catalytic process developed by Ziegler, alpha-olefins have been polymerized in the presence of catalysts comprising compounds of the transition metals of Groups 4 to 6 and 8 of the Periodic Table of Elements, preferably titanium compounds, and organometallic compounds of elements of Groups 1 to 3 of the Periodic Table, especially aluminum alkyls or aluminum alkyl halides.

The polymers produced in accordance with the process can be usefully employed to produce products such as molded articles, hollow articles, pipe, tube or film by injection molding, blow molding and extrusion processes.

It is known that in the process of producing propylene homo-polymers or co-polymers of propylene with ethylene or higher alpha olefins or the production of higher alpha olefin homo-polymers and co-polymers the removal of residual catalyst from product polymer is necessary in order to avoid damage to the equipment emplqyed during the high temperature processing of product polymer. Therefore, in order to rid product polymer of residual catalyst it has been necessary to deash, i.e. wash product polymer in accordance with known washing treatment processes.

The process of removing residual catalyst by washing can be eliminated by employing a high efficiency catalyst which obtains greater than 10,000 grams polymer per gram of active transition metal catalyst component thereby obtaining trace amounts of catalyst in the polymer product. As well known in the art, however, for example in polypropylene polymerization, concommitment with increasing polymerization catalyst efficiency is the decrease in percent of crystalline polymer in polymer product.

As is known, propylene and its higher homologs have been polymerized in the presence of stereospecific catalysts to form solid, high molecular weight polymers of high crystallinity. The high crystallinity polypropylene comprises isotactic polypropylene which is the result of a head to tail linkage of the monomer units with retention of steric configuration under the polymerization process. Noncrystalline or atactic polypropylene results from random linkage of the monomer units or failure to maintain steric configuration. It is the high crystallinity which obtains the highly desirable polymer properties. Generally commercially useful polypropylene will have less than 5 or 6% atactic material hence excess atactic polymer needs to be removed.

The washing for the removal of residual catalyst and the extraction for the removal of atactic polymer add significantly to the cost of polymer produced in the presence of the Ziegler catalysts.

As discussed in British Pat. No. 1,001,820 it has been known to employ electron donors in combination with Ziegler catalysts in order to increase the stereoregularity or isotactic composition of higher alpha-olefins. The electron donors usefully employed are ethers, phosphines, phosphites, phosphates, phosphoramides, carboxylic acids, nitro-containing compounds, sulfur-containing compounds, arsines, stibines, esters, ketones and the like. Although these catalyst compositions tend to increase the isotacticity of the polymer product the electron donors also tend to greatly decrease the catalytic activity of the catalyst thereby resulting in the production of substantially less polymer per unit of catalyst in a given period of time.

In Japanese Sho No. 50-108383 it is taught that in order to obtain both high catalytic efficiency and a high degree of stereoregularity one should employ two distinct electron donors selected from certain ethers, amines, trialkylphosphines, N-oxides of quinoline, phosphoric acid esters, phosphoric acid amides, phosphine oxides, ketones, urea and its derivative and the like in concert with certain Lewis acids. Nevertheless, the improvement in catalyst efficiency and stereoregularity as measured by heptane insolubles is not sufficient to result in a viable commercial process.

In U.S. Pat. No. 3,639,375 it is taught to employ dual electron donors in combination with a catalyst system comprising $TiCl_3.AA$ an organoaluminum compound, and optionally an organozinc compound.

The objective in these prior methods is to generally increase the activity and/or stereospecificity of the catalyst systems. Nevertheless, there is still a need for further improvement to obtain a commercially useful catalyst system which would result in the elimination of polymer deashing and extraction.

In U.S. Pat. No. 4,525,467 of Huff et al., a co-catalyst system is described comprising aliphatic hydrocarbon soluble mix of two different aluminum alkyls and a particular group of Lewis bases. This co-catalyst, when employed in a propylene polymerization process with a transition metal containing catalyst, obtains a highly active polymerization process with very low heptane insolubles.

SUMMARY OF THE INVENTION

The catalyst system of the present invention advantageously obtains a surprisingly broader operating range for high catalyst activity while maintaining the high heptane insolubles of polymer product than that obtained in accordance with the teaching in U.S. Pat. No. 4,525,467, thereby simplifying process control and reducing the need for polymer extraction.

The present invention provides an improved co-catalyst composition usefully employed in combination with a transition metal compound for use in the polymerization of olefins, particularly alpha-olefins, and especially for the production of stereoregular polyolefins and especially homo- or co-polymers of propylene.

It is, therefore, an objective of this invention to provide a new, unique and improved co-catalyst composition useful in the production of polymers of alpha-olefins. It is a further objective of this invention to provide a catalyst system comprising the unique and improved co-catalyst composition and a transition metal compound which obtains polymer product in accordance with a highly efficient catalytic process useful over a broad range of operating conditions and obtaining both high stereoregularity and improved catalytic activity. It is a further object to provide a polymerization process employing the catalyst system of this invention.

The co-catalyst composition obtaining the unexpected catalytic activity in combination with a transition metal compound catalyst for the polymerization of alpha-olefins to solid, highly stereoregular polymers comprises mixed aluminum hydrocarbyl-Lewis base composition comprising (i) at least two different classes of aluminum hydrocarbyls, the first (1) being an aluminum hydrocarbyl halide or mixtures of aluminum hydrocarbyl halides, the second class (2) being one of an aluminum hydrocarbyl hydride, aluminum trialkyl or mixtures there of, the hydrocarbyl radical being an alkyl, cycloalkyl, aryl, aralkyl or alkaryl radical having from 1 to 20 carbon atoms and (ii) at least one Lewis base represented by the formula:

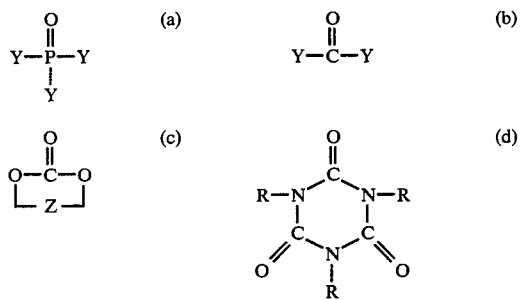

wherein each Y can be —OR', —NR$_2$ and R' with the proviso that at least two be —OR' or —NR$_2$, Z is an alkylene radical forming a 5 or 6 membered ring with the carbonyldioxy group, i.e. Z is a dimethylene or trimethylene radical or Z is alkyl substituted alkylene radical, wherein the alkyl radical can have from 1 to 8 carbon atoms, R is an alkyl, aryl or allyl radical having from 1 to 20 carbon atoms and R' is an alkyl, cycloalkyl, aryl, alkaryl or aralkyl radical having from 1 to 20 carbon atoms dissolved in an aromatic solvent.

The compounds represented by

are preferred and the dialkyl carbonates are most preferred.

The co-catalyst composition is usefully employed in combination with a compound of a Group 4b, 5b, 6b and 8 transition metal compound (the Periodic Table referred to herein is the 56th Edition of Handbook of Chemistry and Physics, CRC Press, 1975). Preferably the transition metal compound is one of titanium, vanadium, zirconium, chromium or mixtures thereof.

The essence of the present invention relates to the mixed aluminum hydrocarbyl-Lewis base co-catalyst composition being (i) soluble in and chemically modified by aromatic hydrocarbons, such as toluene or xylene, (ii) comprising the two classes of organoaluminum compound as defined herein and (iii) the Lewis base comprising the at least one Lewis base compound as defined herein. Insolubility of the aluminum hydrocarbyl-Lewis base complex co-catalyst composition for example will result in a significant decrease in the heptane insolubles, i.e. decrease in the isotacticity of the polymer product.

The catalyst of the present invention comprising the aromatic hydrocarbon soluble mixed aluminum hydrocarbyl-Lewis base co-catalyst and the transition metal compound provides a highly efficient catalyst yielding as high as from 11,000 to 19,000 grams and even greater of polymer product per gram of titanium chloride. The high efficiency thereby reduces residual catalyst in the final polymer product thereby substantially eliminating the need for polymer deashing. The heptane insoluble portion in accordance with the present invention remains high, i.e. greater than 92% and even greater than 96% thereby greatly reducing or eliminating the costs of extraction to remove non-stereoregular or atactic polymer.

DETAILED DESCRIPTION OF THE INVENTION

The high efficiency, highly stereospecific, broad operating range, aromatic hydrocarbon modified and soluble mixed aluminum hydrocarbyl-Lewis base co-catalyst composition of this invention comprises (i) at least two different classes of aluminum hydrocarbyls, the first being an aluminum hydrocarbyl halide or mixture of aluminum hydrocarbyl halides, the second being one of an aluminum hydrocarbyl hydride, aluminum trialkyl or mixtures thereof, wherein the hydrocarbyl radical can be an alkyl, cycloalkyl, aryl, alkaryl or aralkyl radical having from 1 to 20 carbon atoms and (ii) at least one Lewis base represented by the formula:

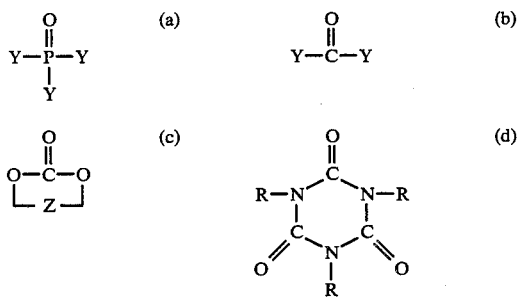

wherein each Y can be —OR', —NR$_2$ and R' with the proviso that at least two be —OR' or —NR$_2$, Z is an alkylene radical forming a 5 or 6 membered ring with the carbonyldioxy group, i.e. Z is a dimethylene or trimethylene radical or Z is hydrocarbyl substituted alkylene radical wherein the hydrocarbyl radical can have from 1 to 8 carbon atoms, R is an allyl, aryl or alkyl group having from 1 to 20 carbon atoms and R' is an alkyl, cycloalkyl, aryl, alkaryl or aralkyl radical having from 1 to 20 carbon atoms.

Any aluminum hydrocarbyl halide can be suitably employed in accordance with this invention. The aluminum hydrocarbyl halides employed are typically those represented by the general formula AlR"$_n$R'"$_m$X$_{3-(n+m)}$ wherein R" and R'" each represent a hydrocarbyl group such as an alkyl, aryl, alkaryl, aralkyl or cycloalkyl and X represents a halogen atom such a fluorine, chlorine, bromine or iodine and m an n each represent an integer such that $0 < (n+m) < 3$. Suitable non-limiting examples of preferred hydrocarbon soluble aluminum alkyls halides are diethyl aluminum chloride, di-n-propyl aluminum chloride, di-i-butyl aluminum chloride, dimethyl aluminum chloride, dimethyl aluminum bromide, ethyl-t-butyl aluminum chloride, bis-(2-ethylhexyl) aluminum chloride, bis-n-dodecyl aluminum chloride, diphenyl aluminum chloride, aluminum sesquihalides such as ethyl aluminum sesquichloride and the like. Diethyl aluminum chloride is preferred. Mixtures of the aluminum hydrocarbyl halides can be readily employed.

Any of the known aromatic hydrocarbon solvents for aluminum hydrocarbyl halides can be usefully employed. Suitable non-limiting examples of solvents which may be readily employed are toluene, xylenes, benzene., mono, di and tri hydrocarbyl substituted benzenes such as ethyl benzenes, diethylbenzenes, triethylbenzenes, tetraethylbenzenes, tetramethylbenzenes, hexamethylbenzenes, trimethylbenzenes, naphthalene, biphenyl, azulene, diethylmethylbenzenes and halogenated benzenes such as chlorobenzene and dichlorobenzene and mixtures of these aromatics. Especially preferred are: toluene, mixed xylenes, ethyl benzenes, and mixed trimethylbenzenes.

Mixtures of aliphatic solvents or halogenated aliphatic solvents with the atomatic solvents can be employed in the event solubility of the aluminum alkyl-Lewis base system is not severely diminished.

The second class of organoaluminum compounds usefully employed in accordance with the invention are selected from aluminum hydrocarbyl hydrides, aluminum trialkyls or mixtures thereof wherein the hydrocarbyl radical can be an alkyl, cycloalkyl, aryl, aralkyl, alkaryl radical and the like having from 1 to 20 carbon atoms. Suitable non-limiting examples of aluminum dihydrocarbyil hydrides are diethyl aluminum hydride, di-i-butyl aluminum hydride and dioctyl aluminum hydride. Suitable nonlimiting examples of the aluminum trialkyls include triethylaluminum, tri-n-propylaluminum, tri-n-butylaluminum, tri-i-butylaluminum, tri-n-hexylaluminum, tri-i-hexylaluminum, tri-2-methyl-pentylaluminum, tri-n-octylaluminum, tri-n-decylaluminum, di (2-ethylcyclopentyl) aluminum ethyl, 2-norbornyl aluminum dibutyl, dicyclohexyl aluminum ethyl and the like, the most preferred aluminum hydrocarbyl hydride is di-i-butyl aluminum hydride, the most preferred aluminum trihydrocarbyls are triethylaluminum and tri-i-butylaluminum.

Preferred mixed aluminum alkyl are dialkyl aluminum chloride and aluminum trialkyl or dialkyl aluminum chloride and dialkyl aluminum hydride. Especially preferred combinations are diethyl aluminum chloride and triethyl aluminum or diethyl aluminum chloride and diisobutyl aluminum hydride.

The molar ratio of the hydrocarbyl aluminum halide to the second aluminum hydrocarbyl or mixtures of aluminum hydrocarbyl can range widely so long as the final catalyst is effective. Desirable ratios are in the range of about 20:1 to about 1:1 and preferably 10:1 to about 1:1.

A special feature of this invention is the class of Lewis bases which can be usefully employed to form the aliphatic hydrocarbon soluble aluminum hydrocarbyl-Lewis base co-catalyst composition.

Suitable non-limiting examples of the compositions represented by

tris (N, N-dimethyl) phosphoramide, (i.e., hexamethyl phosphoramide)
tris (N, N-dicyclopentyl) phosphoramide,
tris (N, N-dibenzyl) phosphoramide,
tris (N, N-dieicosyl) phosphoramide,
tris (N, N-di-4,5-dipentyl-2-naphthyl) phosphoramide,
tris (N, N-diphenyl) phosphoramide,
tris (N, N-diethyl) phosphoramide,
tris (N, N-diisobutyl) phosphoramide,
tris (N, N-di-3-octylphenyl) phosphoramide,
tris (N, N-di-2-phenylcyclohexyl) phosphoramide,
tris (N-methyl, N-propyl) phosphoramide
dimethoxyethyl phosphine oxide,
diethoxyethyl phosphine oxide,
dibutoxyethyl phosphine oxide,
dibutoxypropyl phosphine oxide,
dibenzyloxyethyl phosphine oxide, and the like.

Suitable non-limiting examples of compositions represented by formula

are:
diphenyl carbonate, di-2-tolyl carbonate, dibenzyl carbonate, di-3-tolyl carbonate, diethyl carbonate, dimethyl carbonate, diisobutyl carbonate, tetramethylurea, tetraethylurea, tetrabutylurea, tetraphenylurea, methylcarbamate, ethylcarbamate, propylcarbamate, butylcarbamate, benzylcarbamate, isobutylcarbamate, isopropylcarbamate, 2-methyl-2-butylcarbamate, the ethyl ester of N-benzylcarbamic acid, the butyl ester of N-butylcarbamic acid, the butyl ester of N-ethylcarbamic acid, and the like.

Illustrative of the compositions represented by formula c) are ethylenecarbonate, propylenecarbonate and the like.

Illustrative of the compositions represented by formula d) are triallylcyanurate, tripropylcyanurate, triphenylcyanurate, and the like.

The preferred Lewis bases utilized in accordance with this invention are hexamethyl phosphoramide, triallylcyanurate, tetramethyl urea, diethyl carbonate, dimethyl carbonate, diethoxy ethyl phosphine oxide, ethylene carbonate, propylene carbonate and diphenyl carbonate. The dialkyl carbonates being most preferred.

Examples of preferred aromatic hydrocarbon soluble mixed aluminum hydrocarbyl-Lewis base compositions are dioctyl aluminum chloride, triethyl aluminum and hexamethylphosphoramide; diisobutyl aluminum chloride, diisobutyl aluminum hydride and tetramethyl urea; diethyl aluminum chloride, triethyl aluminum and triallylcyanurate; diethyl aluminum chloride, diisobutyl aluminum hydride and triallylcyanurate; diethyl aluminum chloride, triethyl aluminum and diethyl carbonate; diethyl aluminum chloride, diisobutyl aluminum hydride and diethyl carbonate; diisobutyl aluminum chloride, triethyl aluminum and diethoxy ethyl phosphine oxide; diisobutyl aluminum chloride, triethyl aluminum and ethylene carbonate and diethyl aluminum chloride, diisobutyl aluminum hydride and dimethyl carbonate.

The molar ratio of the second class of aluminum alkyls to the Lewis base can be from about 2:1 to about 30:1 and preferably 4:1 to about 20:1 most preferably the ratio is about 8:1 to about 16:1 in order to achieve the high catalytic efficiency and the most acceptable heptane insolubles.

The aromatic hydrocarbon soluble mixed aluminum hydrocarbyl-Lewis base co-catalyst composition of this invention is prepared by adding the aluminum compounds and the Lewis base to a suitable aromatic solvent. The preferred order of addition is the first aluminum hydrocarbyl halide added to the aromatic hydrocarbon followed by the Lewis base and thereafter the second aluminum compound. Alternatively, the Lewis base can be added to the aromatic solvent first followed by the addition of the aluminum compounds either mixed or in the order aluminum hydrocarbyl halide followed by the second aluminum compound. The temperature of the solvent can vary over a wide range, for example, from 20° C. to about 80° C. Preferably the temperature is room temperature. Contact of the second class of organoaluminum compounds with the Lewis base prior to contact with the aluminum alkyl halide may result in an inoperative system.

The aromatic hydrocarbon soluble mixed aluminum hydrocarbyl-Lewis based co-catalyst composition is employed in combination with a transition metal compound for the polymerization of alphaolefins to high molecular weight stereoregular polyolefins. The transition metal compounds are selected from compound of the Group 4b, 5b, 6b and 8 transition metals. The preferred compounds are represented by the formula $TrO_s(OR)_tX_{u-2s-t}$ wherein Tr is the Group 4b-6b or 8 transition metal with a valency of $n=3$, 4 or 5, O is oxygen, s is 0 or 1, R is an alkyl, aryl, cycloalkyl group having 1 to 8 carbon atoms or substituted derivative thereof, X is a halide and $0 \leq t \leq u$. Preferably, the transition metal is generally selected from the group consisting of titanium, vanadium, zirconium, and chromium. In practice, the transition metal is generally selected from titanium and vanadium, most preferably titanium. Some examples of the preferred transition metal compounds which may be usefully employed in accordance with this invention are $TiCl_3$, $TiCl_4$, $Ti(OCH_3)Cl_3$, $Ti(OCH_2CH_3)Cl_3$, $VCl_3$, $VOCl_2$, $VOCl_3$, $VO(OCH_3)Cl_2$. In the preferred aspects of this invention the transition metal compound is titanium trichloride and preferably what is known as low aluminum titanium trichloride.

The low aluminum titanium trichloride can be prepared by reducing titanium tetrachloride with an organoaluminum compound which is represented by the general formula $Al R_nX_{3-n}$ wherein R is a hydrocarbon radical containing from 1 to 20 carbon atoms such as alkyl, aryl, aralkyl, alkaryl or cycloalkyl radicals with alkyl radicals having from 1 to 8 carbon atoms being preferred, X is as defined herein above and n is a number within the range $1 \leq n \leq 3$ or mixtures thereof under low temperatures to obtain a titanium trichloride reduced solid. The reduced solid thus obtained is thereafter treated by any of the methods well known in the art for obtaining a commercially useful titanium halide catalyst. The reduced solids for example can be contacted with a complexing agent which is a Lewis base containing an electron donor atom or group such as for example esters, ketones, ethers or amides and with titanium tetrachloride or a halogenated hydrocarbon for a time and temperature sufficient to convert the reduced solid titanium trichloride to a purple form titanium trichloride. The preferred low aluminum titanium trichlorides are known compounds which can be prepared according to the processes disclosed in U.S. Pat. Nos. 4,127,504, 4,210,738 and 4,321,346, for example, which are incorporated herein in their entirety by reference.

In a further preferred aspect of this invention the $TiC_3$ containing reduced solids is prepolymerized prior to conversion to the purple or delta-type $TiCl_3$. Prepolymerization is accomplished by contacting the beta-$TiCl_3$ reduced solids in its mother liquor with one of ethylene, an alpha-olefin having from 3 to 6 carbon atoms or a mixture of propylene and a higher alpha-olefin having from 4 to 20 carbon atoms. The ethylene or alpha-olefin is contacted with the reduced solid so as to obtain a prepolymerized beta-type $TiCl_3$ solid product containing about 1 to about 1,000 weight percent of prepolymerized olefin based on the weight of $TiCl_3$.

Upon completion of prepolymerization the prepolymerized reduced solid is thereafter activated as described above. Prepolymerization of the $TiCl_3$ can be effected according to the methods described in U.S. Pat No. 4,295,991, for example, which is incorporated herein in its entirety by reference.

The molar ratio of the transition metal halide to aluminum alkyl compounds can vary over a wide range. Preferably the molar ratio is in the range of 1:50 to about 1:2 and most preferably 1:20 to about 1:6.

The transition metal catalyst and the aromatic hydrocarbon soluble mixed aluminum hydrocarbyl-Lewis base co-catalyst composition of this invention can be contacted by means well known in the art and in accordance with the particular polymerization process employed. In accordance with this invention the polymerization reaction is preferably conducted according to the slurry method employing an inert hydrocarbon or most preferably liquid propylene as the vehicle. However, it is possible to conduct the polymerization in the vapor phase. The polymerization temperature can be in the range of about 50° C. to about 100° C. and is preferably at a range of about 60° C. to about 80° C. The polymerization pressure can also vary over a wide range and is not particularly limited. The polymerization pressure can for example be in the range from between atmospheric pressure to 37 atmospheres. The polymerization process in accordance with this invention obtains polypropylene having a heptane insoluble of at least 90% and preferably 93% or greater with a total ash content of not more than about 500 ppm and preferably less than 150 ppm. In accordance with the invention hydrogen can be also added to the polymerization system as a molecular weight regulator. Use of hydrogen is well known in the art and needs no further description. The catalyst system of this invention can usefully be employed for the polymerization of propylene, copolymers of propylene such as for example propylene and higher alpha-olefins and/or diolefins such as butene 1, hexene-1, or propylene and ethylene. Illustrative of the copolymers are ethylene/propylene copolymer, propylene/butene-1 copolymer, propylene/ethylene/1,4-hexadiene terpolymer, propylene/ethylene/ethylidenenorbornene terpolymer, propylene/ethylene/butene-1 terpolymer and the like. The catalyst system of this invention can also be usefully employed for the preparation of impact co-polymers.

Because of the advantageous balance with respect to heptane insolubles and ash content the expensive steps of the polymer extraction and polymer deashing is greatly reduced or essentially eliminated.

The following examples illustrate certain embodiments of the present invention are intended only to illustrate the invention and not to be construed in any limited sense.

EXAMPLES

In the examples following the titanium trichloride catalyst component is typically prepared in the laboratory by adding to a 1 liter reactor 180 ml of 4 molar DEAC over 6 hours to 71.1 ml of neat $TiCl_4$ in 278.1 ml of hexane at a temperature range of about $-2°$ C. to about $+2°$ C. Upon completion of the DEAC addition to the $TiCl_4$ the reaction was maintained at $0°$ C. for one hour, then heated at the rate of 120 C. per minute to $20°$ C. and thereafter at the rate of $2°$ C. per minute to $65°$ C. The reactor was maintained at about $65°$ C. for one hour. To the recovered brownish $TiCl_3$ solids with mother liquor was added 60 ml of hexane. The $TiCl_3$ slurry was contacted in a nitrogen purged 1 liter polymerization reactor containing an agitator with 55.8 grams of propylene by passing propylene into the reactor at the rate of about 1 gm per minute and at a temperature of about $38°$ C. to obtain a prepolymerized $TiCl_3$ comprising about 30 weight percent polymer. The recovered hexane washed (4×by decantation in 681 ml hexane at $60°$ C. and settling ½ hour prior to decant) prepolymerized $TiCl_3$ wet cake is contacted in 116 ml n-hexane containing 109 grams of hexachloroethane and 90 grams of di-n-butyl-ether. The reactor was heated to $85°$ C. and held at that temperature for 5 hours. The recovered $TiCl_3$ catalyst is washed 4 times in n-hexane by decantation.

In the examples where mixed metal alkyls are employed, the mixture is prepared by adding 90 milliliters of one molar of the first aluminum alkyl in hexane to 10 milliliters of one molar of the second aluminum alkyl in hexane, ending with a solution which is one molar in mixed metal alkyls and 9:1 in a molar ratio of the first metal alkyl to the second metal alkyl.

The heptane insolubles (HI)—a measure of the crystallinity of polypropylene—was in each case determined by extracting a 2 gm ground sample of polymer product with hot heptane for 1.5 hours by means of a Soxhlet extractor and employing the equation $$\% HI = \frac{\text{Wt of extracted sample}}{\text{Wt of sample}} \times 100$$

Abbreviations:
DMC=dimethylcarbonate
DEAC=diethylaluminum chloride
DIBAH=diisobutylaluminum hydride
TEA=triethylaluminum
xylene=mixed xylenes
HMB=hexamethylbenzene

EXAMPLE 1

A cocatalyst was prepared by admixing:
1. 5 ml of a 5 volume % solution of DMC in toluene
2. 27.5 ml of a 15 volume % solution of DEAC in toluene
3. 4.5 ml of a 10 volume % solution of DIBAH in toluene.

To a $N_2$ purged 2-liter reactor there was introduced 3.7 ml of the above termix (i.e., 2.8 ml toluene, 3.6 mmoles DEAC, 0.4 mmoles DIBAH, 0.2 mmoles DMC), 20 psig $H_2$, and 1450 ml of liquid propylene. The reactor was brought to $70°$ C. and 0.124 mmoles of $TiCl_3$ in white oil was flushed into the reactor with liquid propylene. The polymerization began immediately and was continued for 5.5 hours, at which time the temperature was rapidly decreased to about $25°$ C., the reactor vented of unused propylene and the produced polypropylene recovered. The recovered polypropylene was dried, extruded as pellets and pressed into a pad to allow determination of metals by X-ray fluorescence. The indicated titanium level in product polypropylene was calculated to an efficiency of 11.1 kg/g of $TiCl_3$; the heptane insolubles was 96.6%.

EXAMPLE 2

A cocatalyst was prepared by admixing:
1. 5 ml of a 5 volume % solution of DMC in toluene
2. 27.5 ml of a 15 volume % solution of DEAC in toluene
3. 5.4 ml of a 10 volume % solution of DIBAH in toluene.

To a $N_2$ purged 2-liter reactor there was introduced 3.7 ml of the above termix (i.e., 3.2 ml toluene, 3.45 mmoles DEAC, 0.465 mmoles DIBAH, 0.2 mmoles DMC), 20 psig $H_2$, and 1450 ml of liquid propylene. The reactor was brought to $70°$ C. and 0.169 mmoles of $TiCl_3$ in white oil was flushed into the reactor with liquid propylene. The polymerization began immediately and was continued for 5.5 hours, at which time the temperature was rapidly decreased to about $25°$ C., the reactor vented of unused propylene and the produced polypropylene recovered. The recovered polypropylene was dried, extruded as pellets and pressed into a pad to allow determination of metals by X-ray fluorescence. The indicated titanium level in product polypropylene was calculated to an efficiency of 11.5 kg/g of $TiCl_3$; the heptane insolubles was 96.8%.

EXAMPLE 3

A cocatalyst was prepared by admixing:
1. 5 ml of a 5 volume % solution of DMC in toluene
2. 27.5 ml of a 15 volume % solution of DEAC in toluene
3. 6.3 ml of a 10 volume % solution of DIBAH in toluene.

To a $N_2$ purged 2-liter reactor there was introduced 3.7 ml of the above termix (i.e., 3.19 ml toluene, 3.4 mmoles DEAC, 0.52 mmoles DIBAH, 0.2 mmoles DMC), 20 psig $H_2$, and 1450 ml of liquid propylene. The reactor was brought to $70°$ C. and 0.139 mmoles of $TiCl_3$ in white oil was flushed into the reactor with liquid propylene. The polymerization began immediately and was continued for 5.5 hours, at which time the temperature was rapidly decreased to about $25°$ C., the reactor vented of unused propylene and the produced polypropylene recovered. The recovered polypropylene was dried, extruded as pellets and pressed into a pad to allow determination of metals by X-ray fluorescence. The indicated titanium level in product polypropylene was calculated to an efficiency of 14.3 kg/g of $TiCl_3$; the heptane insolubles was 97.1%.

EXAMPLE 4

A cocatalyst was prepared by admixing:
1. 5 ml of a 5 volume % solution of DMC in toluene 2. 27.5 ml of a 15 volume % solution of DEAC in toluene
3. 9 ml of a 10 volume % solution of DIBAH in toluene.

To a $N_2$ purged 2-liter reactor there was introduced 4.0 ml of the above termix (i.e., 3.5 ml toluene, 3.4 mmoles DEAC, 0.76 mmoles DIBAH, 0.2 mmoles DMC), 20 psig $H_2$, and 1450 ml of liquid propylene. The reactor was brought to 70° C. and 0.141 mmoles of $TiCl_3$ in white oil was flushed into the reactor with liquid propylene. The polymerization began immediately and was continued for 5.5 hours, at which time the temperature was rapidly decreased to about 25° C., the reactor vented of unused propylene and the produced polypropylene recovered. The recovered polypropylene was dried, extruded as pellets and pressed into a pad to allow determination of metals by X-ray fluorescence. The indicated titanium level in product polypropylene was calculated to an efficiency of 15 kg/g of $TiCl_3$; the heptane insolubles was 96.4%.

EXAMPLE 5

A cocatalyst was prepared by admixing:
1. 5 ml of a 5 volume % solution of DMC in toluene
2. 27.5 ml of a 15 volume % solution of DEAC in toluene
3. 18 ml of a 10 volume % solution of DIBAH in toluene.

To a $N_2$ purged 2-liter reactor there was introduced 5.0 ml of the above termix (i.e., 3.58 ml toluene, 3.6 mmoles DEAC, 1.58 mmoles DIBAH, 0.2 mmoles DMC), 20 psig $H_2$, and 1450 ml of liquid propylene. The reactor was brought to 70° C. and 0.132 mmoles of $TiCl_3$ in white oil was flushed into the reactor with liquid propylene. The polymerization began immediately and was continued for 5.5 hours, at which time the temperature was rapidly decreased to about 25° C., the reactor vented of unused propylene and the produced polypropylene recovered. The recovered polypropylene was dried, extruded as pellets and pressed into a pad to allow determination of metals by X-ray fluorescence. The indicated titanium level in product polypropylene was calculated to an efficiency of 16.7 kg/g of $TiCl_3$; the heptane insolubles was 94.9%.

EXAMPLE 6

A cocatalyst was prepared by admixing:
1. 2.5 ml of a 5 volume % solution of DMC in toluene
2. 27.5 ml of a 15 volume % solution of DEAC in toluene
3. 18 ml of a 10 volume % solution of DIBAH in toluene.

To a $N_2$ purged 2-liter reactor there was introduced 5.0 ml of the above termix (i.e., 4.37 ml toluene, 3.75 mmoles DEAC, 1.65 mmoles DIBAH, 0.1 mmoles DMC), 20 psig H2, and 1450 ml of liquid propylene. The reactor was brought to 70° C. and 0.149 mmoles of $TiCl_3$ in white oil was flushed into the reactor with liquid propylene. The polymerization began immediately and was continued for 5.5 hours, at which time the temperature was rapidly decreased to about 25° C., the reactor vented of unused propylene and the produced polypropylene recovered. The recovered polypropylene was dried, extruded as pellets and pressed into a pad to allow determination of metals by X-ray fluorescence. The indicated titanium level in product polypropylene was calculated to an efficiency of 18.7 kg/g of $TiCl_3$; the heptane insolubles was 92.2%.

Examples 1-6 demonstrate the broad range of operability of the aromatic based system, i.e. from DIBAH/DMC=2 to 16 or greater. The aliphatic based analog gave acceptable results at DIBAH/DMC=2.5 but a large decrease in HI at DIBAH/DMC>3.0.

EXAMPLE 7

This example shows trialkylaluminum compounds can be used as well as dialkylaluminum hydrides. A cocatalyst was prepared by admixing:
1. 5 ml of a 5 volume % solution of DMC in toluene
2. 27.5 ml of a 15 volume % solution of DEAC in toluene
3. 18 ml of a 10 volume % solution of TEA in toluene.

To a $N_2$ purged 2-liter reactor there was introduced 4.0 ml of the above termix (i.e., 3.58 ml toluene, 3.6 mmoles DEAC, 1.6 mmoles TEA, 0.2 mmoles DMC), 20 psig $H_2$, and 1450 ml of liquid propylene. The reactor was brought to 70° C. and 0.132 mmoles of $TiCl_3$ in white oil was flushed into the reactor with liquid propylene. The polymerization began immediately and was continued for 5.5 hours, at which time the temperature was rapidly decreased to about 25° C., the reactor vented of unused propylene and the produced polypropylene recovered. The recovered polypropylene was dried, extruded as pellets and pressed into a pad to allow determination of metals by X-ray fluorescence. The indicated titanium level in product polypropylene was calculated to an efficiency of 13.6 kg/g of $TiCl_3$; the heptane insolubles was 93.1%.

EXAMPLE 8

A cocatalyst Was prepared Dy admixing:
1. 5 ml of a 5 volume % solution of DMC in xylene
2. 27.5 ml of a 15 volume % solution of DEAC in xylene
3. 18 ml of a 10 volume % solution of DIBAH in xylene.

To a $N_2$ purged 2-liter reactor there was introduced 4.0 ml of the above termix (i.e., 3.58 ml xylene, 3.6 mmoles DEAC, 1.58 mmoles DIBAH, 0.2 mmoles DMC), 20 psig $H_2$, and 1450 ml of liquid propylene. The reactor was brought to 70° C. and 0.129 mmoles of $TiCl_3$ in white oil was flushed into the reactor with liquid propylene. The polymerization began immediately and was continued for 5.5 hours, at which time the temperature was rapidly decreased to about 25° C., the reactor vented of unused propylene and the produced polypropylene recovered. The recovered polypropylene was dried, extruded as pellets and pressed into a pad to allow determination of metals by X-ray fluorescence. The indicated titanium level in product polypropylene was calculated to an efficiency of 17.5 kg/g of $TiCl_3$; the heptane insolubles was 95.7%.

EXAMPLE 9

A cocatalyst was prepared by admixing:
1. 5 ml of a 5 volume % solution of DMC in xylene
2. 27.5 ml of a 15 volume % solution of DEAC in xylene
3. 18 ml of a 10 volume % solution of DIBAH in xylene.

To a $N_2$ purged 2-liter reactor there was introduced 4.0 ml of the above termix (i.e., 3.58 ml xylene, 3.6 mmoles DEAC, 1.58 mmoles DIBAH, 0.2 mmoles DMC), 20 psig $H_2$, and 1450 ml of liquid propylene. The reactor was brought to 75° C. and 0.142 mmoles of $TiCl_3$ in white oil was flushed into the reactor with liquid propylene. The polymerization began immediately and was continued for 5.5 hours, at which time the temperature was rapidly decreased to about 25° C., the reactor vented of unused propylene and the produced polypropylene recovered. The recovered polypropylene was dried, extruded as pellets and pressed into a pad to allow determination of metals by X-ray fluorescence. The indicated titanium level in product polypropylene was calculated to an efficiency of 19.2 kg/g of TiCl$_3$; the heptane insolubles was 91.6%.

EXAMPLE 10

A cocatalyst was prepared by admixing:
1. 5 ml of a 5 volume % solution of DMC in benzene
2. 27.5 ml of a 15 volume % solution of DEAC in benzene
3. 18 ml of a 10 volume % solution of DIBAH in benzene.

To a N$_2$ purged 2-liter reactor there was introduced 4.0 ml of the above termix (i.e., 3.58 ml benzene, 3.6 mmoles DEAC, 1.58 mmoles DIBAH, 0.2 mmoles DMC), 20 psig H$_2$, and 1450 ml of liquid propylene. The reactor was brought to 70° C. and 0.210 mmoles of TiCl$_3$ in white oil was flushed into the reactor with liquid propylene. The polymerization began immediately and was continued for 4.1 hours, at which time the temperature was rapidly decreased to about 25° C., the reactor vented of unused propylene and the produced polypropylene recovered. The recovered polypropylene was dried, extruded as pellets and pressed into a pad to allow determination of metals by X-ray fluorescence. The indicated titanium level in product polypropylene was calculated to an efficiency of 14.6 kg/g of TiCl$_3$; the heptane insolubles was 94.2%.

EXAMPLE 11

This example demonstrates that mixtures of aromatics can be used. A cocatalyst was prepared by admixing:
1. 2.5 ml of a 5 volume % solution of DMC in a solution of 9.1 weight % HMB in toluene
2. 27.5 ml of a 15 volume % solution of DEAC in a solution of 9.1 weight % HMB in toluene
3. 18 ml of a 10 volume % solution of DIBAH in a solution of 9.1 weight % HMB in toluene.

To a N$_2$ purged 2-liter reactor there was introduced 5.0 ml of the above termix (i.e., 4.37 ml of 9.1 weight % of HMB in toluene, 3.75 mmoles DEAC, 1.65 mmoles DIBAH, 0.1 mmoles DMC), 20 psig H$_2$, and 1450 ml of liquid propylene. The reactor was brought to 70° C. and 0.155 mmoles of TiCl$_3$ in white oil was flushed into the reactor with liquid propylene. The polymerization began immediately and was continued for 5.5 hours, at which time the temperature was rapidly decreased to about 25° C., the reactor vented of unused propylene and the produced polypropylene recovered. The recovered polypropylene was dried, extruded as pellets and pressed into a pad to allow determination of metals by X-ray fluorescence. The indicated titanium level in product polypropylene was calculated to an efficiency of 16.1 kg/g of TiCl$_3$; the heptane insolubles was 96.1%.

COMPARATIVE EXAMPLE 1

A cocatalyst was prepared by admixing 15 weight % of DEAC in toluene.

To a N$_2$ purged 2-liter reactor there was introduced 4.0 ml of the above mixture (i.e., 3.4 ml toluene and 5.25 mmoles DEAC), 20 psig H$_2$, and 1450 ml of liquid propylene. The reactor was brought to 70° C. and 0.137 mmoles of TiCl$_3$ in white oil was flushed into the reactor with liquid propylene. The polymerization began immediately and was continued for 5.5 hours, at which time the temperature was rapidly decreased to about 25° C., the reactor vented of unused propylene and the produced polypropylene recovered. The recovered polypropylene was dried, extruded as pellets and pressed into a pad to allow determination of metals by X-ray fluorescence. The indicated titanium level in product polypropylene was calculated to an efficiency of 10.3 kg/g of TiCl$_3$; the heptane insolubles was 96%.

COMPARATIVE EXAMPLE 2

This example demonstrates that absent the Lewis base, one does not obtain the advantages of this invention. A cocatalyst was prepared by admixing:
1. 27.5 ml of a 15 volume % solution of DEAC in toluene
2. 18 ml of a 10 volume % solution of DIBAH in toluene.

To a N$_2$ purged 2-liter reactor there was introduced 5.0 ml of the above mixture (i.e., 4.35 ml toluene, 3.9 mmoles DEAC, and 1.74 mmoles DIBAH), 20 psig H$_2$, and 1450 ml of liquid propylene. The reactor was brought to 70° C. and 0.147 mmoles of TiCl$_3$ in white oil was flushed into the reactor with liquid propylene. The polymerization began immediately and was continued for 1.0 hours, at which time the temperature was rapidly decreased to about 25° C., the reactor vented of unused propylene and the produced polypropylene recovered. The recovered polypropylene was dried, extruded as pellets and pressed into a pad to allow determination of metals by X-ray fluorescence. The indicated titanium level in product polypropylene was calculated to an efficiency of 13.5 kg/g of TiCl$_3$ (in 1 hr.); the heptane insolubles was 52.3%.

COMPARATIVE EXAMPLE 3

To a nitrogen purged 2-liter reactor there was introduced 5 mmoles of a 9:1 diethylaluminum chloride/diisobutylaluminum hydride mixture (as 1 molar combined metal alkyls in hexane solution), 0.2 mmoles dimethylcarbonate (an 0.1 molar hexane solution), 20 psig hydrogen and 1200 ml of liquid propylene. The reactor was brought to 70° C. and 0.161 mmoles of TiCl$_3$ in white oil was flushed into the reactor with liquid propylene. The polymerization began immediately and was continued for 5.5 hours, at which time the temperature was rapidly decreased to about 25° C., the reactor vented of unused propylene and the produced polypropylene recovered. The recovered polypropylene was dried, extruded as pellets and pressed into a pad to allow determination of metals by X-ray fluorescence. The calculated molar ratio of diisobutylaluminum hydride to dimethylcarbonate in this example is 2.5. The indicated titanium level in product polypropylene was calculated to an efficiency of 18.7 kg/gm TiCl$_3$; the heptane insolubles was 94.2%.

COMPARATIVE EXAMPLE 4

To a nitrogen purged 2-liter reactor there was introduced 4.8 mmoles of a 9:1 diethylaluminum chloride/diisobutylaluminum hydride mixture (as 1 molar combined metal alkyls in hexane solution), 0.15 mmoles dimethylcarbonate (a 0.1 molar hexane solution), 20 psig hydrogen and 1200 ml of liquid propylene. The reactor was brought to 70° C. and 0.087 mmoles of TiCl$_3$ in white oil was flushed into the reactor with liquid propylene. The polymerization began immediately and was continued for 5.5 hours, at which time the temperature was rapidly decreased to about 25° C., the reactor vented of unused propylene and the produced polypropylene recovered. The recovered polypropylene was dried, extruded as pellets and pressed into a pad to allow determination of metals by X-ray fluorescence. The calculated molar ratio of diisobutylaluminum hydride to dimethylcarbonate in this example is 3.2. The indicated titanium level in product polypropylene was calculated to an efficiency of 18.8 kg/gm $TiCl_3$; the heptane insolubles was 88.9%.

Comparative Examples 3 and 4 show that, absent the aromatic compound, unacceptable heptane insolubles (<90%) obtains at a calculated molar ratio of diisobutylaluminum hydride to electron donor of 3.2 while a desirable balance of efficiency and heptane insolubles obtains at a molar ratio of 2.5.

the carbonyldioxy group or Z is alkyl substituted alkylene group wherein the alkyl radical can have from 1 to 8 carbon atoms, R is an aryl, allyl or alkyl group having from 1 to 20 carbon atoms and R' is an alkyl, cycloalkyl, aryl or aralkyl radical having from 1 to 20 carbon atoms.

2. The aromatic hydrocarbon solution of claim 1 wherein the molar ratio of the first (1) aluminum hydrocarbyl to the second (2) aluminum hydrocarbyls is in the range of about 20:1 to about 1:1 and the molar ratio of the second (2) aluminum alkyl to the Lewis base is from about 2:1 to about 30:1.

3. The aromatic hydrocarbon solution of claim 2 wherein the molar ratio of the second (2) aluminum hydrocarbyl to the Lewis base is in the range of about 4:1 to about 20:1.

4. The aromatic hydrocarbon solution of claim 2 wherein the mixed aluminum alkyls are selected from

TABLE 1

| EX-AMPLE #* | VEHICLE | [DMC] mmoles/l | [DIBAH] mmoles/l | [DEAC] mmoles/l | DIBAH/DMC | POLYMERIZATION TIME (hrs) | CATALYST EFFICIENCY (Kg PP/gm) | % HI | MFR |
|---|---|---|---|---|---|---|---|---|---|
| 1 | Toluene | 0.13 | 0.26 | 2.4 | 2.0 | 5.5 | 11.1 | 96.6 | 3.3 |
| 2 | Toluene | 0.13 | 0.31 | 2.3 | 2.4 | 5.5 | 11.5 | 96.8 | 2.6 |
| 3 | Toluene | 0.13 | 0.35 | 2.3 | 2.8 | 5.5 | 14.3 | 97.1 | 1.7 |
| 4 | Toluene | 0.13 | 0.51 | 2.3 | 4.0 | 5.5 | 15.0 | 96.4 | 1.4 |
| 5 | Toluene | 0.13 | 1.05 | 2.4 | 8.0 | 5.5 | 16.7 | 94.9 | 1.8 |
| 6 | Toluene | 0.07 | 1.10 | 2.5 | 16.0 | 5.5 | 18.7 | 92.2 | 2.4 |
| 7 | Toluene | 0.13 | 1.05** | 2.4 | 8.0 | 5.5 | 13.6 | 93.1 | 5.1 |
| 8 | Xylene | 0.13 | 1.05 | 2.4 | 8.0 | 5.5 | 17.5 | 95.7 | 4.2 |
| 9$^c$ | Xylene | 0.13 | 1.05 | 2.4 | 8.0 | 5.5 | 19.2 | 91.6 | 6.0 |
| 10 | Benzene | 0.13 | 1.05 | 2.4 | 8.0 | 4.1 | 14.6 | 94.2 | 4.0 |
| 11$^d$ | HMB | 0.07 | 1.10 | 2.5 | 16.0 | 5.5 | 16.1 | 96.1 | 2.7 |
| C-1$^a$ | Toluene | — | — | 3.5 | — | 5.5 | 10.3 | 96.0 | 4.6 |
| C-2$^b$ | Toluene | — | 1.16 | 2.6 | 0.0 | 1.0 | 13.5 | 52.3 | — |
| C-3 | Hexane | 0.2 | 0.5 | 4.5 | 2.5 | 5.5 | 18.7 | 94.2 | 2.9 |
| C-4 | Hexane | 0.15 | 0.48 | 4.3 | 3.2 | 5.5 | 18.8 | 88.9 | — |

*All runs use approximately 0.1 gm C-2032 white oil slurry, approximately 20 psig $H_2$, 70° C. (except see Note c)
**Triethylaluminum for DIBAH
$^a$DEAC base case
$^b$DIBAH/DEAC base case
$^c$Run at 75° C.
$^d$Hexamethyl Benzene as 9.1 wt % solution in Toluene

What is claimed is:

1. An aromatic hydrocarbon solution of mixed aluminum hydrocarbyl-Lewis base co-catalyst composition for use in olefin polymerizations, said composition comprising (i) at least two different classes of aluminum hydrocarbyls, the first class being (1) an aluminum hydrocarbyl halide or mixture of hydrocarbyl halides, the second class being (2) one of an aluminum hydrocarbyl hydride, aluminum trialkyl or mixtures thereof, the hydrocarbyl radical can be an alkyl, cycloalkyl, aryl or aralkyl radical having from 1 to 20 carbon atoms and (ii) at least one Lewis base represented by the formula:

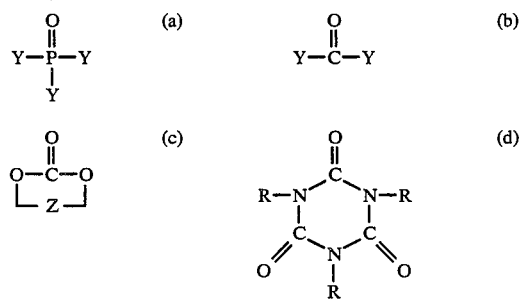

wherein each Y can be —OR', —NR$_2$ or R' with the proviso that at least two be —OR- or —NR$_2$, Z is an alkylene radical forming a 5 or 6 membered ring with the group consisting of dialkyl aluminum chloride and aluminum trialkyl and dialkyl aluminum chloride and dialkyl aluminum hydride.

5. The aromatic hydrocarbon solution of claim 4 wherein the dialkyl aluminum chloride is diethylaluminum chloride, the trialkyl aluminum is triethyl aluminum and the dialkyl aluminum hydride is diisobutyl aluminum hydride.

6. The aromatic hydrocarbon solution of claim 1 wherein the Lewis base is selected from the group consisting of hexamethyl phosphoramide, triallylcyanurate, tetramethyl urea, diethyl carbonate, dimethyl carbonate, diethoxy ethyl phosphine oxide, ethylene carbonate, propylene carbonate and diphenyl carbonate.

7. The aromatic hydrocarbon solution of claim 3 wherein the composition is selected from the group consisting of dioctyl aluminum chloride, triethyl aluminum and hexamethylphosphoramide; diisobutyl aluminum chloride, diisobuyl aluminum hydride and tetramethyl urea; diethyl aluminum chloride, triethyl aluminum and triallylcyanurate; diethyl aluminum chloride, diisobutyl aluminum hydride and triallylcyanurate; diethyl aluminum chloride, triethyl aluminum and diethyl carbonate; diethyl aluminum chloride, diisobuyl aluminum hydride and diethyl carbonate; diethyl aluminum chloride, diisobutyl aluminum hydride and dimethyl carbonate; diisobutyl aluminum chloride, triethyl aluminum and diethoxy ethyl phosphine oxide; diisobutyl aluminum chloride, triethyl aluminum and ethylene carbonate and diethyl aluminum chloride, diisobutyl aluminum hydride and diphenyl carbonate and ethyl aluminum sesquichloride, diisobutylaluminum hydride and diphenyl carbonate.

8. A catalyst composition for the polymerization of olefins comprising
(A) An aromatic hydrocarbon solution of mixed aluminum hydrocarbyl-Lewis base co-catalyst composition comprising (I) at least two different classes of aluminum hydrocarbyls, a first (1) being an aluminum hydrocarbyl halide or mixture of aluminum hydrocarbyl halides, the second (2) being one of an aluminum hydrocarbyl hydride, aluminum trialkyl or mixtures thereof, the hydrocarbyl radical can be an alkyl, cycloalkyl, aryl or aralkyl radical having from 1 to 20 carbon atoms and (ii) at least one Lewis base represented by the formula:

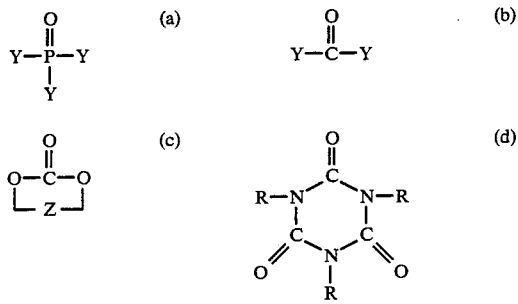

wherein each Y can be —OR′, —NR$_2$ or R′ with the proviso that at least two be —OR′ or —NR$_2$, Z is an alkylene radical forming a 5 or 6 membered ring with the carbonyldioxy group or Z is alkyl substituted alkylene group wherein the alkyl radical can have from 1 to 8 carbon atoms, R is an aryl, allyl or alkyl group having from 1 to 20 carbon atoms and R′ is an alkyl, cycloalkyl, aryl or aralkyl radical having from 1 to 20 carbon atoms,
(B) A group 4b, 5b, 6b, or 8 transition metal compound.

9. The catalyst composition of claim 8 wherein the transition metal compund is a transition metal halide.

10. The catalyst composition of claim 9 wherein the transition metal halide is selected from the group consisting of tetravalent titanium and trivalent titanium.

11. The catalyst composition of claim 10 wherein the transition metal compound is titanium trichloride.

12. The catalyst composition of claim 11 wherein the molar ratio of the first (1) aluminum hydrocarbyl to the second aluminum hydrocarbyls is in the range of about 20:1 to about 1:1 and the molar ratio of the second (2) aluminum alkyl to the Lewis base is from about 2:1 to about 30:1.

13. The catalyst composition of claim 12 wherein the molar ratio of the second (2) aluminum hydrocarbyl to the Lewis base is in the range of about 4:1 to about 20:1.

14. The catalyst composition of claim 11 wherein the mixed aluminum allkyls are selected from the group consisting of dialkyl aluminum chloride and aluminum trialkyl, dialkyl aluminum chloride and dialkyl aluminum hydride.

15. The catalyst composition of claim 14 wherein the dialkyl aluminum chloride is diethylaluminum chloride, the trialkyl aluminum is triethyl aluminum and the dialkyl aluminum hydride is diisobutyl aluminum hydride.

16. The catalyst composition of claim 11 wherein the Lewis base is selected from the group consisting of hexamethyl phosphoramide, triallylcyanurate, tetramethyl urea, diethyl carbonate, dimethyl carbonate, diethyoxyethyl phosphine oxide, ethylene carbonate, and diphenyl carbonate.

17. The catalyst composition of claim 11 wherein the complex composition is selected from the group consisting of dioctyl aluminum chloride, triethyl aluminum and hexamethylphosphoramide; diisobutyl aluminum chloride, diisobuty aluminum hydride and tetramethyl urea; diethyl aluminum chloride, triethyl aluminum and triallylcyanurate; diethyl aluminum chloride, diisobutyl aluminum hydride and triallylcyanurate; diethyl aluminum chloride, triethyl aluminum and diethyl carbonate; diethyl aluminum chloride, diisobutyl aluminum hydride and diethyl carbonate; diethyl aluminum chloride, diisobutyl aluminum hydride and dimethyl carbonate; diisobutyl aluminum chloride, triethyl aluminum and diethoxy ethyl phosphine oxide; diisobutyl aluminum chloride, triethyl aluminum and ethylene carbonate and diethyl aluminum chloride, diisobutyl aluminum hydride and diphenyl carbonate.

18. The catalyst composition of claim 11 wherein the titanium trichloride is obtained by
(i) reducing titanium tetrachloride with an organoaluminum compound at a temperature of from about −50°C. to about 30° C. to produce a reduced solid product and thereafter
(ii) contacting said reduced solids product with a chlorinated saturated hydrocarbon having from 1 to 18 carbon atoms in the presence of a dialkyl ether the alkyl radicals having from, 1 to 16 carbon atoms at a temperature of from about 60° C. to about 100° C. for about 1 to 10 hours to obtain a titanium trichloride containing titanium trichloride of the delta type, and
(iii) recovering the resultant titanium trichloride catalyst component.

19. The catalyst composition of claim 18 wherein the reduced solids obtained in step (i) is prepolymerized with one of ethylene, and alpha olefin having from 3–6 carbon atoms or a mixture of propylene and a higher alpha-olefin having from 4 to 20 carbon atoms to obtain a TiCl$_3$ containing reduced solids prepolymerized with about 1 to 1000 weight percent of prepolymerized olefin based on the weight of TiCl$_3$.

* * * * *